United States Patent [19]

Bundschuh et al.

[11] 4,316,658

[45] Feb. 23, 1982

[54] CAMERA FOR CLOSE-UP AND NORMAL RANGE PHOTOGRAPHY

[75] Inventors: John J. Bundschuh, Penfield; Gerald J. Kosarko, Pavilion, both of N.Y.

[73] Assignee: Eastman Kodak Company, Rochester, N.Y.

[21] Appl. No.: 232,767

[22] Filed: Feb. 9, 1981

[51] Int. Cl.³ .................. G03B 3/00; G03B 7/087
[52] U.S. Cl. ........................ 354/27; 354/29; 354/43; 354/149; 354/196
[58] Field of Search ............ 354/25, 27, 29, 30, 354/43, 47, 139, 149, 196

[56] References Cited

U.S. PATENT DOCUMENTS 3,916,425 10/1975 Tanaka ............................ 354/196
4,059,836 11/1977 Hochreiter et al. ............... 354/29
4,154,517 5/1979 Tamura et al. ................. 354/196 X Primary Examiner—Michael L. Gellner
Attorney, Agent, or Firm—D. P. Monteith

[57] ABSTRACT

A camera, operable in flash and ambient exposure modes, has adjustable lens apparatus useful for close-up and normal range photography. A photoconductively controlled electromagnet, which is energized in accordance with the intensity of ambient light, controls an apertured blade to adjust an exposure aperture. A mechanism is responsive to adjustment of the lens apparatus for a close-up photograph and overrides the electromagnet. This causes the apertured blade to be moved automatically to its minimum aperture position, independently of the exposure mode, when the camera is set for close-up photography, to enhance depth of field.

6 Claims, 5 Drawing Figures

CAMERA FOR CLOSE-UP AND NORMAL RANGE PHOTOGRAPHY

BACKGROUND OF THE INVENTION

1. Field of the Invention

The invention relates to a camera which is useful for both close-up and normal range photography in flash and ambient exposure modes, and which has automatic exposure control apparatus for adjusting an exposure aperture in accordance with scene light intensity. More particularly, the invention provides for restricting the exposure aperture automatically, independently of the exposure mode, when the camera is set for a close-up photograph, to enhance depth of field.

2. Description of the Prior Art

Depth of field depends upon aperture and the distance from a camera's lens to the subject. The smaller the aperture the greater the depth of field. However, the closer the subject the smaller the depth of field.

As the camera gets closer to the subject, the depth of field shrinks. The effect can be compensated for—up to a point—by stopping down the lens.

There are known in the prior art cameras which set an exposure aperture automatically as a function of the intensity of ambient light. When the ambient light is low the camera is set at its largest aperture, which provides the maximum amount of exposure light. Because depth of field is small with a relatively large aperture, a camera having exposure control apparatus of this type has a disadvantage when used for close-up photographs in low ambient light if critical subject definition is required.

There are also known in the prior art cameras having a follow-focus flash system. In general, this includes movable diaphragm blades for defining an adjustable exposure aperture as a function of subject distance. The blades are coupled to a flash sensing member and a lens focusing system. For a close-up flash exposure, the exposure aperture is set at its minimum size. A camera having a follow-focus system provides enhanced depth of field for close-up exposures only when a flash is used, which normally occurs in low ambient light.

There is also known in the prior art a camera which coordinates focus setting and aperture size without requiring a flash. U.S. Pat. No. 4,154,517 describes a camera having a manually adjustable diaphragm for regulating an exposure aperture and a focus adjustment device, which can be set at a predetermined position falling outside a normal focus adjusting range. A coordinating device secures an appropriate depth of field by limiting the size of the exposure aperture when the focus adjustment device is set at its predetermined position.

SUMMARY OF THE INVENTION

According to the present invention, a camera, which is useful for both normal range and close-up photography in flash and ambient exposure modes and which has automatic exposure control apparatus for adjusting an exposure aperture in accordance with ambient light, has an override mechanism coupled to the exposure control apparatus to restrict the exposure aperture, independently of the exposure mode, when the camera is set for close-up photography, to enhance depth of field.

In a preferred embodiment, the camera includes lens apparatus adjustable for varying the focus setting of the camera, an adjustable mechanism for setting an exposure aperture, and a photoconductively controlled electromagnet for causing the adjustable mechanism to establish (1) a relatively large exposure aperture when scene brightness is below a predetermined level, and (2) a restricted exposure aperture when scene brightness is above the predetermined level. Actuatable means is provided for setting the lens apparatus to (1) a first condition for focusing on a close object, and (2) a second condition for focusing on a more distant object. Means, coupled to the electromagnet, is responsive to the setting of the lens apparatus to its first condition for overriding the electromagnet. This causes the adjustable mechanism to stop the exposure aperture down, independently of the exposure mode, thereby enhancing depth of field when the lens is focused for close-up photography and scene brightness is below the predetermined level.

The invention, and its advantages, will become more apparent in the detailed description of a preferred embodiment presented below.

DESCRIPTION OF THE DRAWINGS

In a detailed description of a preferred embodiment of the invention presented below, reference is made to the accompanying drawings, in which.

DESCRIPTION OF A PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
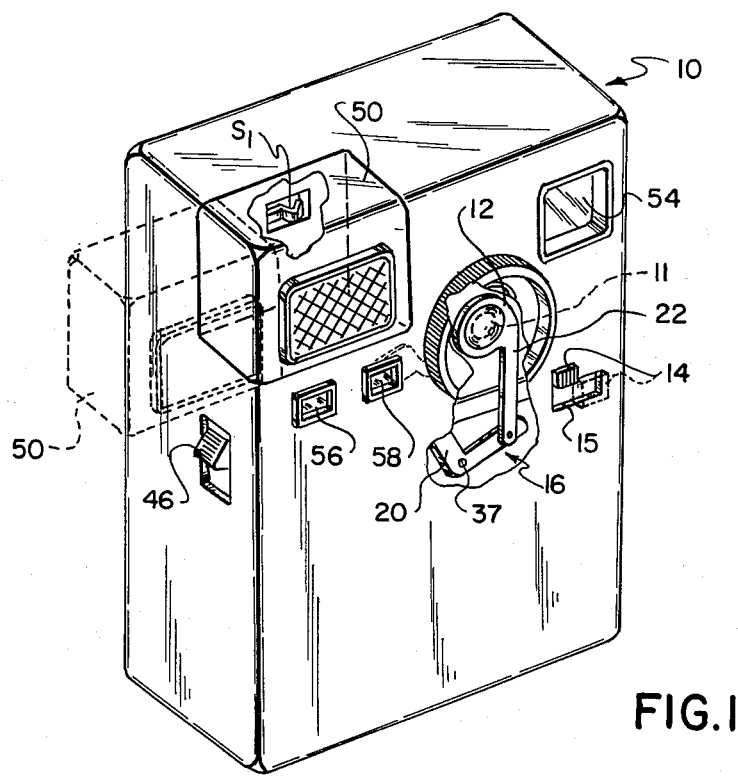
FIG. 1 is a perspective view of a camera, which is useful for close-up and normal range photography and which has an electronic strobe flash unit, portions of the camera and flash unit being broken away for clarity of illustration.

There is shown in FIG. 1 of the drawings a camera 10. The camera 10 has a conventional f/12.8, 100mm focal length lens 11 which is mounted along a picture-taking axis in fixed relation to the camera's exposure plane. The lens 11 is illustrated as a simple single element lens, but can actually include several converging and diverging elements. Preferably, the lens 11 is focused at its hyperfocal distance, say 2.5 meters. Because the standard lens 11 is focused at its hyperfocal distance, its depth of field extends from infinity to one-half its hyperfocal distance or 1.25 meters. To take acceptably focused photographs of close-up subjects, e.g. subjects within approximately 0.5 to 1.25 meters of the camera, a positive supplementary lens 12 is mounted for movement into position in front of the lens 11. Preferably, the power of the lens 12 is one-half diopter, i.e. its focal length is 2 meters.

A knurled button 14, mounted on the front of the camera 10, is coupled to the supplementary lens 12 by a series of linkages 16 to move the supplementary lens in front of the lens 11. The button 14 is mounted for slidable movement within an L-shaped slot 15 between a normal picture-taking position, shown by the dashed lines, and a close-up picture-taking position, shown by the solid lines.

Figure 2:
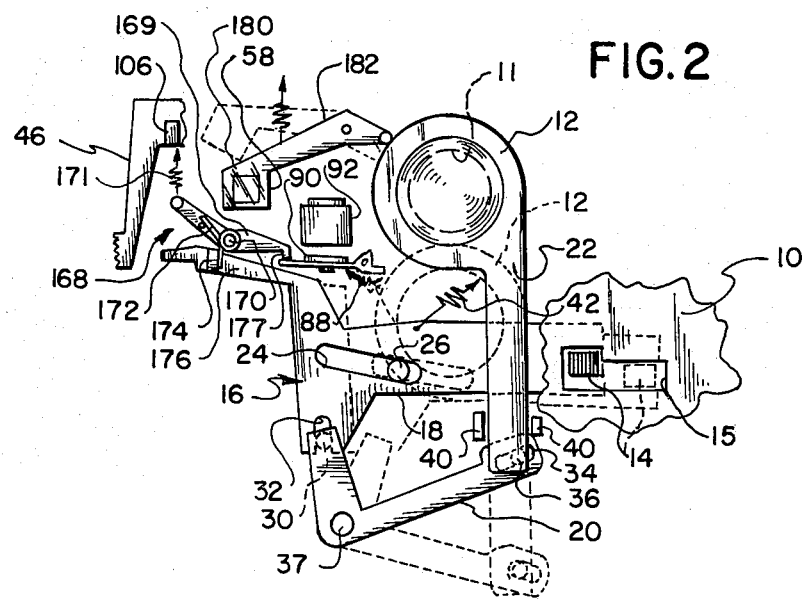
FIG. 2 is a view of apparatus within the camera of FIG. 1 for close-up photography.

Referring now to FIG. 2, the linkages 16 include a slide mechanism 18, which is connected to the button 14, a bell crank 20, and a lens-mount plate 22 on which the lens 12 is mounted. The slide mechanism 18 includes an elongated slot 24 which receives a post 26 attached to an internal camera plate (not shown).

One leg of the bell crank 20 carries a pin 30 which rides within a yoke 32 of the slide mechanism 18. The other leg of the bell crank 20 has a slot 34 which receives a pin 36 carried by the plate 22.

When the button 14 is moved into its normal picture-taking position, the bell crank 20, by means of the coupling of the pin 30 to the yoke 32, is pivoted in the clockwise direction about its mounting pin 37. When the button 14 is in this position, the plate 22 is pulled downwardly by the pin 36 so that the supplementary lens 12 is in an uncovering position with respect to the standard lens 11, as shown by the dashed lines of FIG. 2.

When a camera operator moves the button 14 from its normal position into its close-up position, the slide mechanism 18 pivots the bell crank 20 about the pin 37 in the counterclockwise direction. This pivoting movement causes the plate 22 to move upwardly between guides 40 to position the lens 12 in front of the lens 11. A spring 42 pulls the slide mechanism 18 upwardly and to the right, as viewed in FIG. 2, which causes the button 14 to be seated firmly within the upper right hand corner of the vertical leg of the L-shaped slot 15, as shown. When the lens 12 is positioned in front of the standard lens 11, the subject distance which is focused sharply is approximately 1.1 meters.

Referring back to FIG. 1, a shutter release lever 46 is located on the side of the camera 10 so as to be accessible to a camera operator. The lever 46 is mounted for slidable movement over a first range from an initial raised position to an intermediate position, and over a second range from its intermediate position to a final depressed position. While the lever 46 is moved through its first range, the camera's exposure aperture is adjusted, and when the lever is moved through its second range of positions, film (not shown) is exposed.

Figure 4:
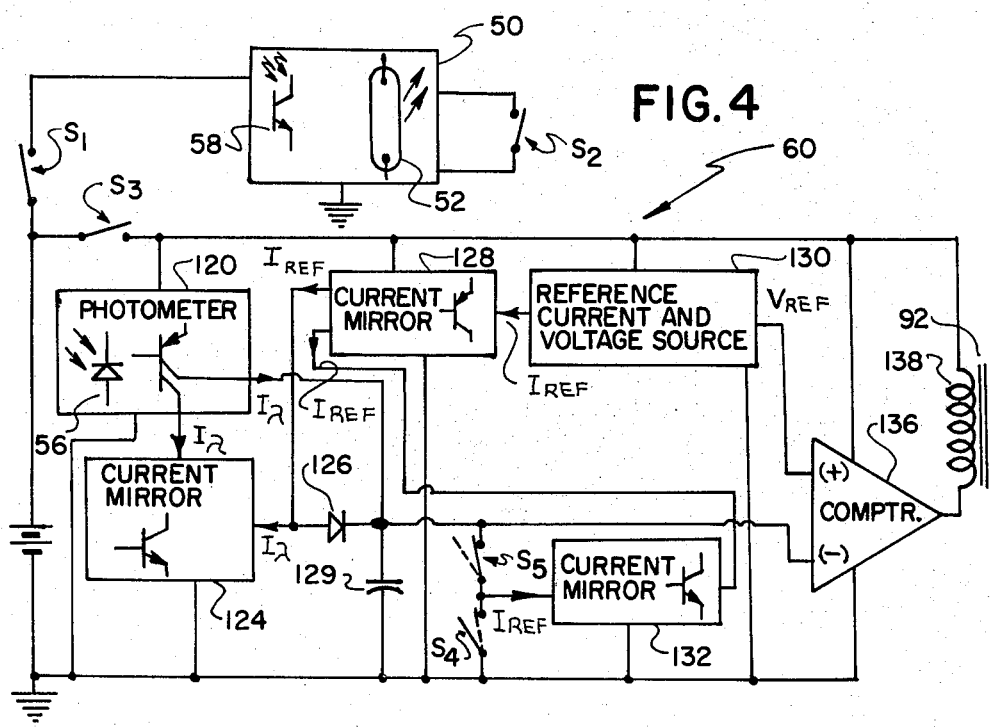
FIG. 4 shows a schematic of a light-responsive circuit for controlling the apparatus of FIG. 3.

A quenchable electronic strobe flash unit 50 is mounted on the top of the camera 10 for slidable movement between a recessed position, shown by the solid lines, wherein the camera is operated in an ambient exposure mode, and an extended position, shown by the dashed lines, wherein the camera is operated in a flash exposure mode. In its recessed position, the flash unit 50 is de-energized, and in its extended position, a switch $S_1$ is closed which causes a firing capacitor (not shown) to be charged with electrical energy. A flash tube 52, shown in FIG. 4, is fired by this energy in response to the closing of a trigger switch $S_2$.

Referring back to FIG. 1, a viewfinder 54 and a pair of spaced light-sensitive devices 56 and 58 are mounted within the front wall of the camera 10. The light-sensitive device 56 is adapted and arranged for measuring the intensity of the prevailing ambient light. A circuit 60 of FIG. 4, which includes the light-sensitive device 56, (1) causes the camera's exposure aperture to be adjusted as a function of ambient light when the camera is focused for normal range photography, and (2) regulates the camera's shutter speed as a function of the ambient light for both close-up and normal range photography.

By means not shown but well known in the art, light-sensitive device 58 is adapted and arranged for sensing the intensity of flash light and for causing the flash tube 52 to be quenched in accordance with the flash illumination reflected from a scene.

Figure 3:
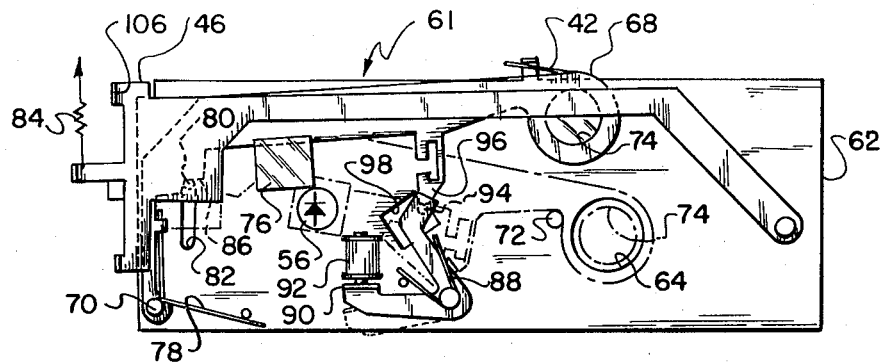
FIG. 3 is a view of apparatus for adjusting an exposure aperture of the camera of FIG. 1, in accordance with the intensity of ambient light.
Figure 5:
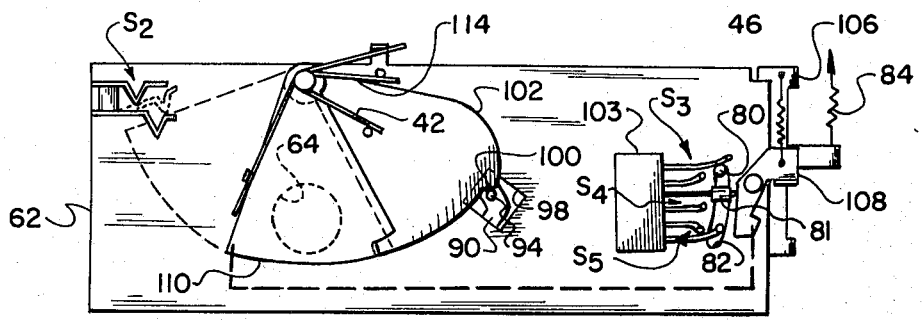
FIG. 5 is a view of apparatus for adjusting the shutter speed of the camera of FIG. 1 in accordance with the ambient light intensity.

Examples of apparatus for adjusting the camera's exposure aperture and shutter speed in accordance with the ambient light are shown, respectively, in FIGS. 3 and 5. Similar apparatus can be found in U.S. Pat. No. 4,059,836, the disclosure of which is incorporated herein by reference.

Apparatus 61 of FIG. 3 constitutes means for adjusting an exposure aperture and includes a mechanism plate 62, which has an f/12.8 exposure aperture 64 for regulating scene light impinging upon the camera's film. A blade 68 is mounted for pivotal movement about a post 70 from a normal, raised position, shown by the solid lines, and an actuated position, shown by the dashed lines, adjacent a stop 72. The blade 68 has an f/18 aperture, denoted 74. When the blade 68 is in its actuated position, the f/18 aperture 74 is concentric with the aperture 64 which reduces the camera's exposure aperture one f-stop. When the exposure aperture is reduced to f/18, one-stop neutral density filter 76, which is carried by the blade 68, covers the photosensitive device 56, so that the intensity of light impinging upon it is reduced in correspondence with reduction in the size of the exposure aperture.

A hairpin spring 78 urges the blade 68 in a clockwise direction about the post 70 toward its actuated position. The shutter release lever 46 carries a pin 80 which can move freely within an elongated slot 82 in the plate 62. A spring 84 biases the lever 46 in the upward direction so that the pin 80 abuttingly engages a shoulder 86 of the blade 68 when the lever is not actuated. The spring 84 causes the pin 80 to exert a stronger force on the blade 68 than the force exerted by the spring 78 so the blade 68 is retained in its raised position when the lever 46 is not actuated.

A hairpin spring 88 lightly biases an armature 90 into abutting engagement with its associated electromagnet 92. When the armature 90 engages the electromagnet 92, a pin 94, carried by the armature 90, engages a depending segment 96 of the blade 68.

Referring now to FIG. 5, the pin 94 extends through a rectangular opening 98 in the plate 62 to engage a shoulder 100 of a shutter closing blade 102 when the closing blade is in its aperture-uncovering position. Thus, by means of the pin 94 of the armature 90, the electromagnet 92, which constitutes energizable means for adjusting an exposure aperture and regulating shutter speed, is coupled to both the blade 68 and the camera's shutter.

A plastic mount 103, which is attached to the back of the plate 62 adjacent the elongated slot 82, houses switches $S_3, S_4$ and $S_5$ of the circuit 60 of FIG. 4. A movable switch arm of each of these 3 switches extends across the slot 82 as shown. The pin 80 of the release lever 46, which is comprised of an electrically non-conductive material, extends through the slot 82 so as to sequentially engage each switch arm. The switch $S_3$ is normally closed but is held open by the pin 80 when the release lever 46 is in its raised, deactuated position of FIGS. 3 and 5. The switch S₄ is normally open, and is closed by the pin 80 once the release lever 46 is depressed to or beyond its intermediate position. The switch S₅ is normally closed. It is opened when an electrically non-conductive pad 81, which is attached to the movable arm of the switch S₄, engages the movable arm of the switch S₅. For a reason made apparent hereafter, as the shutter release lever 46 is depressed, the switch S₄ closes shortly before the switch S₅ opens, and the switch S₅ is arranged to open in synchronism with the opening of the camera's shutter.

Referring now to the circuit 60 of FIG. 4, a photometer 120, which includes the light-sensitive device 56, which preferably is a photodiode, produces two equal output currents, denoted $I\lambda$. The current $I\lambda$ is proportional to the intensity of the ambient light impinging upon the photodiode 56. U.S. Pat. Nos. 4,037,237 and 4,059,836 describe photometers each of which produce multiple currents corresponding to light impinging upon a photodiode.

An NPN current mirror 124 is arranged to receive as its input one of the currents $I\lambda$. The circuit 124 serves to sink a current equal to $I\lambda$ at its output, which is connected to the junction between a diode 126 and the output of a PNP current mirror 128.

A timing capacitor 129, which is connected between ground and an output of the photometer 120, produces an integrated signal for causing de-energization of the electromagnet 92.

A circuit 130 produces a reference current, $I_{REF}$, and a reference voltage, $V_{REF}$. The current $I_{REF}$ corresponds to the current which is produced by the photometer 120 when the intensity of the light impinging upon the photodiode 56 equals a predetermined level, which preferably is 185 foot-lamberts. The voltage $V_{REF}$ corresponds to the voltage to which the capacitor 129 is to be charged for causing the de-energization of the electromagnet 92.

The current mirror 121, in response to the current $I_{REF}$ produced by the circuit 130, produces two currents which are equal to the reference current $I_{REF}$. One reference current is applied to the junction between the anode of the diode 126 and an output of the current mirror 124. The second reference current is applied to the input of an NPN current mirror 132. The circuit 132 sinks a current equal to $I_{REF}$ at its output, which is connected to a junction between the switches S₄ and S₅. As shown, the switches S₄ and S₅ are connected in series, parallel to the capacitor 129.

The circuit 130 provides the voltage $V_{REF}$ at the non-inverting input terminal of a voltage comparator 136. The capacitor 129 is connected to the inverting input terminal of the comparator 136. The comparator 136 produces a low level voltage at its output, when the voltage at its inverting input terminal, i.e., the capacitor's voltage, is less than $V_{REF}$, and produces a high level output voltage, when its inverting terminal voltage is greater than its non-inverting terminal voltage. A coil 138 of the electromagnet 92, which is connected to the output of the comparator 136, as shown, is energized and de-energized respectively when the voltage produced by the comparator 136 is low and high.

Immediately after the shutter release lever 46 is initially actuated but prior to an exposure the electromagnet 92 causes the camera's exposure aperture to be set, depending upon the ambient light intensity and the focus setting of the camera. Then, further actuation of the lever 46 causes the electromagnet 92 to control the speed of the camera's shutter.

To achieve sequential control of the blade 68 and the shutter using a single electromagnet, the circuit 60 operates in association with the camera's exposure control apparatus as follows. Assume for the time being that the capacitor 129 is discharged initially. To effect an exposure, a camera operator moves the release lever 46 downwardly against the restoring force of the spring 84. The initial downward movement of the lever 46 disengages the pin 80 from the switch S₃, thereby allowing the switch to close and energizing the circuit 60. The movement of the lever 46 up to this point occurs prior to an exposure, and the switches S₄ and S₅ are still respectively opened and closed.

When the ambient light intensity is below 185 foot lamberts, the current $I\lambda$ is less than the current $I_{REF}$. Because the current mirror 124 sinks a current equal to $I\lambda$, a difference current equal to $I_{REF}$ less $I\lambda$ is caused to flow through the diode 126. The current $I\lambda$ produced by the photometer 120 is added to this difference current at the junction between the cathode of the diode 126 and the capacitor 129, thereby producing a resultant current equal to $I_{REF}$. However, because the switches S₄ and S₅ are initially respectively opened and closed, the current mirror 132 sinks the current $I_{REF}$. Therefore, no current flows into the capacitor 129 and it remains discharged.

The voltage comparator 136 therefore produces its low level output voltage when the ambient light intensity is low. The coil 138 of the electromagnet 92 is energized, which magnetically latches the armature 90. This causes the pin 94 of the armature 90 to engage the segment 96, thereby retaining the blade 68 in its raised position against the influence of the spring 78. Accordingly, when the ambient light is low, the camera's exposure aperture is set at f/12.8.

On the other hand, when the ambient light intensity is above 185 foot lamberts, the current $I\lambda$ is greater than the current $I_{REF}$. The current mirror 124 therefore attempts to sink a current that is greater than the reference current produced by the current mirror 128. This causes the output stage of the current mirror 124 to saturate which grounds the anode of the diode 126. The diode 126 is prevented from conducting current toward the capacitor 129. As the diode 126 is grounded, the current $I\lambda$ produced by the photometer 120 is the sole current flowing toward the capacitor 129. Because the current mirror 132 sinks a current $I_{REF}$, the capacitor 129 is charged by a current equal to $I\lambda$ less $I_{REF}$.

The capacitor 129 quickly charges to a voltage that is greater than $V_{REF}$. Accordingly, the comparator 136 produces its high level output voltage, which de-energized the coil 138 of the electromagnet 92.

The force of the spring 78 is stronger than the force of the spring 88. Therefore, as the pin 86 moves downwardly in the slot 82, prior to an exposure, the blade 68 pivots in the clockwise direction about the post 70 to cover the f/12.8 exposure aperture 64 with the smaller f/18 aperture 74. Once the segment 96 of the blade 68 moves past the pin 94 of the armature 90, the weak spring 88 returns the armature to its position of FIG. 3. re-engaging the shoulder 100 of the shutter closing blade 102.

The capacitor 129, and the springs 78 and 88 are selected so that the blade 68 can be set in bright light and the pin 94 of the armature 90 returned to its shutter engaging position before the lever 46 moves to its intermediate position to close the switch S$_4$.

Once the release lever 46 has moved to its intermediate position so that the pin 80 closes the switch S$_4$, the capacitor 121 is short-circuited, and discharges to ground. This causes the comparator 136 to produce its low level output voltage and assures that the coil 138 is energized at this position of the release lever 46, even if the coil had been de-energized during the initial movement of the release button. Therefore, in either bright or low ambient light, the blade 68 is set by the time the shutter release lever 46 has been moved to its intermediate position, and the armature 90 is magnetically latched, which blocks the shutter closing blade 102 in its aperture-uncovering position.

After the switch S$_4$ is closed, further downward movement of the release lever 46 causes the pin 80 to open the switch S$_5$. At the same time, a lug 106 of the lever 46 engages a pivotally mounted shutter latch 108. The latch 108 is coupled to an shutter opening blade 110, as shown diagrammatically in FIG. 5. When the lever 46 engages the latch 108, the shutter blade 110 is released. A spring 112 drives the blade 110 into its aperture uncovering position, shown by the dashed lines of FIG. 5, thereby commencing an exposure. In response to the opening of the shutter, the "x" synchronization switch S$_2$ is closed by the blade 110 which causes the flash unit 50 to fire if it is in its extended position.

When the switch S$_5$ opens, the capacitor 129 commences to charge. Also, the current mirror 132 is prevented by sinking the current $I_{REF}$. In bright light, the current charging the capacitor 129 equals I. In low light, the current charging the capacitor 129 equals $I_{REF}$. The current $I_{REF}$ causes the capacitor 129 to charge to $V_{REF}$ in an interval that is equivalent to the longest time that the camera can be effectively handheld steady during the exposure, for example, 1/30 second.

Thus, after an interval which is inversely proportional to the magnitude of the current charging the capacitor 129, the capacitor is charged to $V_{REF}$, and the coil 138 is thereby de-energized. This causes the electromagnet 92 to release the armature 90.

When the coil 138 is de-energized, the shutter closing blade 102 is moved under the influence of a spring 114 into its aperture-covering position, thereby terminating the exposure.

If the light is dim so that the blade 68 had been held by the pin 94 in its raised position, the spring 78 drives the blade 68 toward its actuated position as the shutter is closing. However, the spring 114 closes the shutter before the spring 78 moves the blade 68 into its aperture-covering position.

When the camera 10 is focused for a close-up photograph, depth of field is very limited. To provide enhanced definition of close-up subjects when ambient light is low, independently of the camera's exposure mode, an override mechanism 168, shown in FIG. 2, is provided for causing the camera lens to be stopped down automatically to f/18, independently of ambient light, when the supplementary lens 12 is used.

The mechanism 168 includes a lever 169 mounted for movement about a pivot pin 170. A weak spring 171 biases the lever 169 in the clockwise direction, and a hairpin spring 172 biases the lever in the counterclockwise direction. The tension in the spring 172 is adjusted by a projection 174 on a finger 176 of the slide mechanism 18.

When the button 14 is in its close-up position, the projection 174 causes the tension in the spring 172 to be reduced so that it applies a force to the lever 169 that is weaker than the force applied by the spring 171. In this case, the spring 171 pivots the lever 169 in the clockwise direction which causes its nose 177 to disengage the armature 90 from the electromagnet 92 against the influence of the spring 88. The resulting air gap between the armature 90 and the electromagnet 92 prevents the electromagnet from magnetically latching the armature when the coil 138 is energized in low ambient light. Therefore, whether the light intensity is bright or dim, the spring 78 (see FIG. 3) causes the blade 68 to set the exposure aperture at f/18 and to position the filter 76 over its photodiode 56 when the supplementary lens 12 is used.

For close-up photography, the flash unit 50 can readily produce adequate flash exposure light even though the smaller f/18 exposure aperture 74 is used. For normal range photography in low ambient light, adequate flash exposure light is produced as long as the subject is within approximately four meters of the camera 10. So that the flash tube 52 produces the same amount of flash exposure light when the f/18 aperture is used for close-up photography as when the larger f/12.8 aperture is used, a 1-stop neutral density filter 180 is provided. One end of a pivotably mounted lever 182 carries the filter 180, and the other end is attached to the plate 22 for movement therewith. When the supplementary lens 12 covers the standard lens 11, the plate 22 positions the lever 182 so that the filter 180 covers the flash unit's photosensitive device 58.

When the slider 14 is in its normal position, the projection 174 causes the tension in the spring 172 to be increased so that its spring force is now greater than the force of the spring 171. The spring 172 pivots the lever 169 in the counterclockwise direction so that its nose 177 is disengaged from the armature 90. The electromagnet 92 can now control the blade 68 in accordance with light intensity, as described previously herein.

If the override mechanism 168 remained operative during a close-up exposure, the overriding of the electromagnet 92 would cause the timing of the shutter to be improper because the electromagnet also controls operation of the shutter closing blade 102. Therefore, if the lens 12 is used, the lever 169 is arranged so that when the release lever 46 is depressed to its intermediate position, the lug 106 engages the lever 169. Further downward movement of the lever 46 causes the lug 106 to pivot the lever 169 in the counterclockwise direction disengaging the nose 177 from the armature 90 before the lug 106 releases the shutter latch 108. The spring 88 returns the armature 90 into engagement with the electromagnet 92 immediately before the shutter blade 110 opens so that the energization and subsequent de-energization of the coil 138 can control the timing of the shutter.

The invention has been described in detail with particular reference to a preferred embodiment thereof, but it will be understood that variations and modifications can be effected within the spirit and scope of the invention. For example, the energizable means can be a motor, and the camera can be provided with an axially movable lens for close-up photography. If the camera has adjustable lens of this type, enhanced depth of field for close-up photography can be set automatically by causing the override mechanism 168 to be enabled in response to movement of the lens into its close-up picture-taking position.

We claim:

1. In a camera having means for selecting either a flash exposure mode or an ambient exposure mode, an adjustable mechanism for setting an exposure aperture, energizable means for controlling said adjustable mechanism to set an exposure aperture, a photosensor exposed to ambient light, a movable member, and circuitry, including switch means controlled by said movable member, for operatively coupling said photosensor to said energizable means, said circuitry being effective in response to movement of said member to cause said energizable means to assume (1) a first condition when the ambient light exposing said photosensor is below a predetermined level, to establish a relatively large exposure aperture, and (2) a second condition when the ambient light is above the predetermined level, to establish a restricted exposure aperture, the improvement comprising:
  (a) lens apparatus adjustable for varying the focus setting of said camera;
  (b) actuatable means for setting said lens apparatus to (1) a first focus setting condition for focusing on a close subject, and (2) a second focus setting condition for focusing on a remote object; and
  (c) override means, coupled to said actuatable means, responsive to the setting of said lens apparatus to its first condition for causing said adjustable mechanism to establish a restricted exposure aperture, independently of whether a flash exposure mode or an ambient exposure mode is selected, thereby enhancing depth of field whenever said lens apparatus is set for close-up photography and the ambient light is below the predetermined level.

2. In a camera having means for selecting either a flash exposure mode or an ambient exposure mode, an adjustable mechanism for setting an exposure aperture, energizable means for controlling said adjustable mechanism to set an exposure aperture, a photosensor exposed to ambient light, a movable member, and circuitry, including switch means controlled by said movable member, for operatively coupling said photosensor to said energizable means, said circuitry being effective in response to movement of said member to cause said energizable means to assume (1) a first condition when the ambient light exposing said photosensor is below a predetermined level, to establish a relatively large exposure aperture, and (2) a second condition when the ambient light is above the predetermined level, to establish a restricted exposure aperture, the improvement comprising:
  (a) lens apparatus adjustable for varying the focus setting of said camera;
  (b) actuatable means for setting said lens apparatus to (1) a first focus setting condition for focusing on a close subject, and (2) a second focus setting condition for focusing on a remote object; and
  (c) override means, coupling said actuatable means and said energizable means, responsive to the setting of said lens apparatus to its first condition for effectively preventing said energizable means from assuming its first condition in response to movement of said member, said override means being effective to cause said adjustable mechanism to be controlled to establish a restricted exposure aperture, independently of whether a flash exposure mode or an ambient exposure mode is selected, thereby enhancing depth of field whenever said lens apparatus is set for close-up photography and the ambient light is below the predetermined level.

3. In a camera having means for selecting either a flash exposure mode or an ambient exposure mode, an adjustable mechanism for setting an exposure aperture, means including an energizable electromagnet for controlling said adjustable mechanism to set an exposure aperture, a photosensor exposed to ambient light, a movable member, and circuitry, including switch means controlled by said movable member, for coupling said photosensor to said electromagnet, said circuitry being effective in response to movement of said member to cause said electromagnet to assume (1) a first condition when the ambient light exposing said photosensor is below a predetermined level, to establish a relatively large exposure aperture, and (2) a second condition when the ambient light is above the predetermined level, to establish a restricted exposure aperture, the improvement comprising:
  (a) lens apparatus adjustable for varying the focus setting of said camera;
  (b) actuatable means for setting said lens apparatus to (1) a first focus setting condition for focusing on a close subject, and (2) a second focus setting condition for focusing on a remote object; and
  (c) override means, coupling said actuatable means and said electromagnet, responsive to the setting of said lens apparatus to its first condition for preventing said electromagnet from assuming its first condition, said override means being effective to cause said adjustable mechanism to be controlled to establish a restricted exposure aperture, independently of whether a flash exposure mode or an ambient exposure mode is selected, thereby enhancing depth of field whenever said lens apparatus is set for close-up photography and the ambient light is below the predetermined level.

4. In a camera having means for selecting either a flash exposure mode or an ambient exposure mode, an adjustable mechanism for setting an exposure aperture, means including an energizable electromagnet for controlling said adjustable mechanism to set a desired exposure aperture, a photosensor exposed to ambient light, a member movable within a predetermined range, and circuitry, including switch means controlled by said movable member, for coupling said photosensor to said electromagnet, said circuitry being effective in response to movement of said member (1) to energize said electromagnet to establish a relatively large exposure aperture when the ambient light exposing said photosensor is below a predetermined level, and (2) to de-energize said electromagnet to establish a restricted exposure aperture setting when the ambient light is above the predetermined level, the improvement comprising:
  (a) lens apparatus adjustable for varying the focus setting of said camera;
  (b) actuatable means for setting said lens apparatus to (1) a first focus setting condition for focusing on a close subject, and (2) a second focus setting condition for focusing on a remote object; and
  (c) an override mechanism, coupled to said electromagnet and to said actuatable means, responsive to the setting of said lens apparatus to its first condition for effectively preventing the energizing of said electromagnet during movement of said member, said override mechanism being effective to cause said adjustable mechanism to be controlled to establish a restricted exposure aperture, independently of whether a flash exposure mode or an ambient exposure mode is selected, thereby enhancing depth of field whenever said lens apparatus is set for close-up photography and the ambient light is below the predetermined level.

5. In a camera having an adjustable mechanism for setting an exposure aperture, an actuatable shutter for regulating exposure duration, a member movable in a first range during which said mechanism is adjusted and movable in a second range during which said shutter is actuated to uncover and cover the exposure aperture to control an exposure, means, including an electromagnet coupled to said mechanism and said shutter, effective upon initial energization and de-energization of said electromagnet for controlling said mechanism and effective upon subsequent energization and de-energization of said electromagnet for controlling said shutter, a photosensor exposed to scene brightness, and circuitry, including switch means controlled by said movable member, for coupling said photosensor to said electromagnet, said circuitry being effective in response to movement of said member in said first range (1) to energize said electromagnet when scene brightness is below a predetermined level to control said mechanism to establish a relatively large exposure aperture, and (2) to de-energize said electromagnet when scene brightness is above the predetermined level to control said mechanism to establish a restricted exposure aperture, said circuitry also being effective in response to movement of said member in said second range to energize and de-energize said electromagnet to control said shutter to produce an exposure duration relating to scene brightness, the improvement comprising:
 (a) lens apparatus adjustable for varying the focus setting of said camera;
 (b) actuatable means for setting said lens apparatus to (1) a first focus setting condition for focusing on a close subject, and (2) a second focus setting condition for focusing on a remote object; and
 (c) override means, coupling said actuatable means and said electromagnet, responsive to the setting of said lens apparatus to its first condition for effectively preventing the energizing of said electromagnet when said member is moved in its first range, said override means being effective to cause said adjustable mechanism to be controlled to establish a restricted exposure aperture, thereby enhancing depth of field whenever said lens apparatus is set for close-up photography and scene brightness is below the predetermined level.

6. In a camera having an adjustable mechanism for setting an exposure aperture, an actuatable shutter for regulating exposure duration, a member movable in a first range during which said mechanism is adjusted and movable in a second range during which said shutter is actuated to uncover and cover the exposure aperture to control an exposure, means, including an electromagnet coupled to said mechanism and said shutter, effective upon initial energization and de-energization of said electromagnet for controlling said mechanism and effective upon subsequent energization and de-energization of said electromagnet for controlling said shutter, a photosensor exposed to scene brightness, and circuitry, including switch means controlled by said movable member, for coupling said photosensor to said electromagnet, said circuitry being effective in response to movement of said member in said first range (1) to energize said electromagnet when scene brightness is below a predetermined level to control said mechanism to establish a relatively large exposure aperture, and (2) to de-energize said electromagnet when scene brightness is above the predetermined level to control said mechanism to establish a restricted exposure aperture, said circuitry also being effective in response to movement of said member in said second range to energize and de-energize said electromagnet to control said shutter to produce an exposure duration relating to scene brightness, the improvement comprising:
 (a) lens apparatus adjustable for varying the focus setting of said camera;
 (b) actuatable means for setting said lens apparatus to (1) a first focus setting condition for focusing on a close subject, and (2) a second focus setting condition for focusing on a remote object;
 (c) override means, coupling said actuatable means and said electromagnet, responsive to the setting of said lens apparatus to its first condition for effectively preventing the energizing of said electromagnet when said member is moved in its first range, said override means being effective to cause said adjustable mechanism to be controlled to establish a restricted exposure aperture, thereby enhancing depth of field whenever said lens apparatus is set for close-up photography and scene brightness is below the predetermined level; and
 (d) means, coupling said movable member and said override means, for causing said override means to allow said electromagnet to control said shutter when said movable member is moved in its second range.

* * * * *